US011124699B2

(12) United States Patent
Xu et al.

(10) Patent No.: US 11,124,699 B2
(45) Date of Patent: Sep. 21, 2021

(54) SELF PROPPING SURFACTANT FOR WELL STIMULATION

(71) Applicant: Halliburton Energy Services, Inc., Houston, TX (US)

(72) Inventors: Liang Xin Xu, The Woodlands, TX (US); Philip Nguyen, Houston, TX (US); Kai He, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/617,804

(22) PCT Filed: Nov. 17, 2017

(86) PCT No.: PCT/US2017/062217
§ 371 (c)(1),
(2) Date: Nov. 27, 2019

(87) PCT Pub. No.: WO2019/099022
PCT Pub. Date: May 23, 2019

(65) Prior Publication Data
US 2020/0190399 A1    Jun. 18, 2020

(51) Int. Cl.
*E21B 43/26* (2006.01)
*C09K 8/84* (2006.01)
*C09K 8/60* (2006.01)
*C09K 8/68* (2006.01)
*C09K 8/80* (2006.01)
*E21B 43/267* (2006.01)

(52) U.S. Cl.
CPC .............. *C09K 8/845* (2013.01); *C09K 8/602* (2013.01); *C09K 8/68* (2013.01); *C09K 8/80* (2013.01); *E21B 43/26* (2013.01); *E21B 43/267* (2013.01); *C09K 2208/10* (2013.01)

(58) Field of Classification Search
None
See application file for complete search history.

(56) References Cited

U.S. PATENT DOCUMENTS

| 9,145,510 | B2 | 9/2015 | Crews et al. |
| 9,512,352 | B2 | 12/2016 | Roddy et al. |
| 2014/0000891 | A1 | 1/2014 | Mahoney et al. |
| 2014/0349894 | A1 | 11/2014 | Quintero et al. |
| 2016/0114303 | A1 | 4/2016 | John et al. |

(Continued)

FOREIGN PATENT DOCUMENTS

| WO | 2013043292 | 3/2013 |
| WO | 2016140591 | 9/2016 |
| WO | 2016187361 | 11/2016 |

OTHER PUBLICATIONS

ISRWO International Search Report and Written Opinion for PCT/US2017/062217 dated Aug. 16, 2018.

(Continued)

*Primary Examiner* — Andrew Sue-Ako
(74) *Attorney, Agent, or Firm* — Tenley Krueger; C. Tumey Law Group PLLC

(57) ABSTRACT

A method of fracturing a subterranean formation may comprise: pumping a fracturing fluid into the subterranean formation, through a wellbore, at or above a fracture gradient of the subterranean formation, wherein the fracturing fluid comprises halloysite nanotubes.

20 Claims, 2 Drawing Sheets

(56) References Cited

U.S. PATENT DOCUMENTS

2016/0230543 A1* 8/2016 Borrell .................... E21B 47/11
2016/0355727 A1   12/2016 Barati Ghahfarokhi
2017/0247598 A1*  8/2017 Kennedy ............... E21B 33/138
2020/0392398 A1* 12/2020 Nguyen ................. C09K 8/602

OTHER PUBLICATIONS

Xu, L., He, K., & Nguyen, C. (2015). Insights into Surfactant Containing Fracturing Fluids Inducing Microcracks and Spontaneously Imbibing in Shale Rocks. SPE/CSUR Unconventional Resources Conference.
Xu, L., He, K., Rane, J. P., Yin, X., & Neeves, K. (2015). Spontaneously Imbibed Fluids for Increasing Contact Area Between Hydraulic Fracturing Fluids and Formation Matrix in Liquids-Rich Shale Plays. SPE Liquids-Rich Basins Conference—North America.
Morsy, S., & Sheng, J. J. (2014). Imbibition Characteristics of the Barnett Shale Formation . SPE Unconventional Resources Conference.
Owoseni, O., Nyankson, E., Zhang, Y., Adams, S. J., He, J., McPherson, G. L., . . . John, V. T. (2014). Release of Surfactant Cargo from Interfacially-Active Halloysite Clay Nanotubes for Oil Spill Remediation. Langmuir, 30(45), 13533-13541.

* cited by examiner

SELF PROPPING SURFACTANT FOR WELL STIMULATION

BACKGROUND

Fracturing treatments are commonly used in subterranean operations, among other purposes, to stimulate the production of desired fluids (e.g., oil, gas, water, etc.) from a subterranean formation. For example, hydraulic fracturing treatments generally involve pumping a treatment fluid (e.g., a fracturing fluid) into a well bore that penetrates a subterranean formation at a sufficient hydraulic pressure to create or enhance one or more fractures in the subterranean formation. The creation and/or enhancement of these fractures may enhance the production of fluids from the subterranean formation.

In order to maintain and/or enhance the conductivity of a fracture in a subterranean formation, proppant may be deposited in the fracture, for example, by introducing a fluid carrying those proppant into the subterranean formation. The proppant may prevent the fractures from fully closing upon the release of hydraulic pressure, forming conductive channels through which fluids may flow to the wellbore.

BRIEF DESCRIPTION OF THE DRAWINGS

These drawings illustrate certain aspects of the present disclosure, and should not be used to limit or define the disclosure.

DETAILED DESCRIPTION

Figure 1:
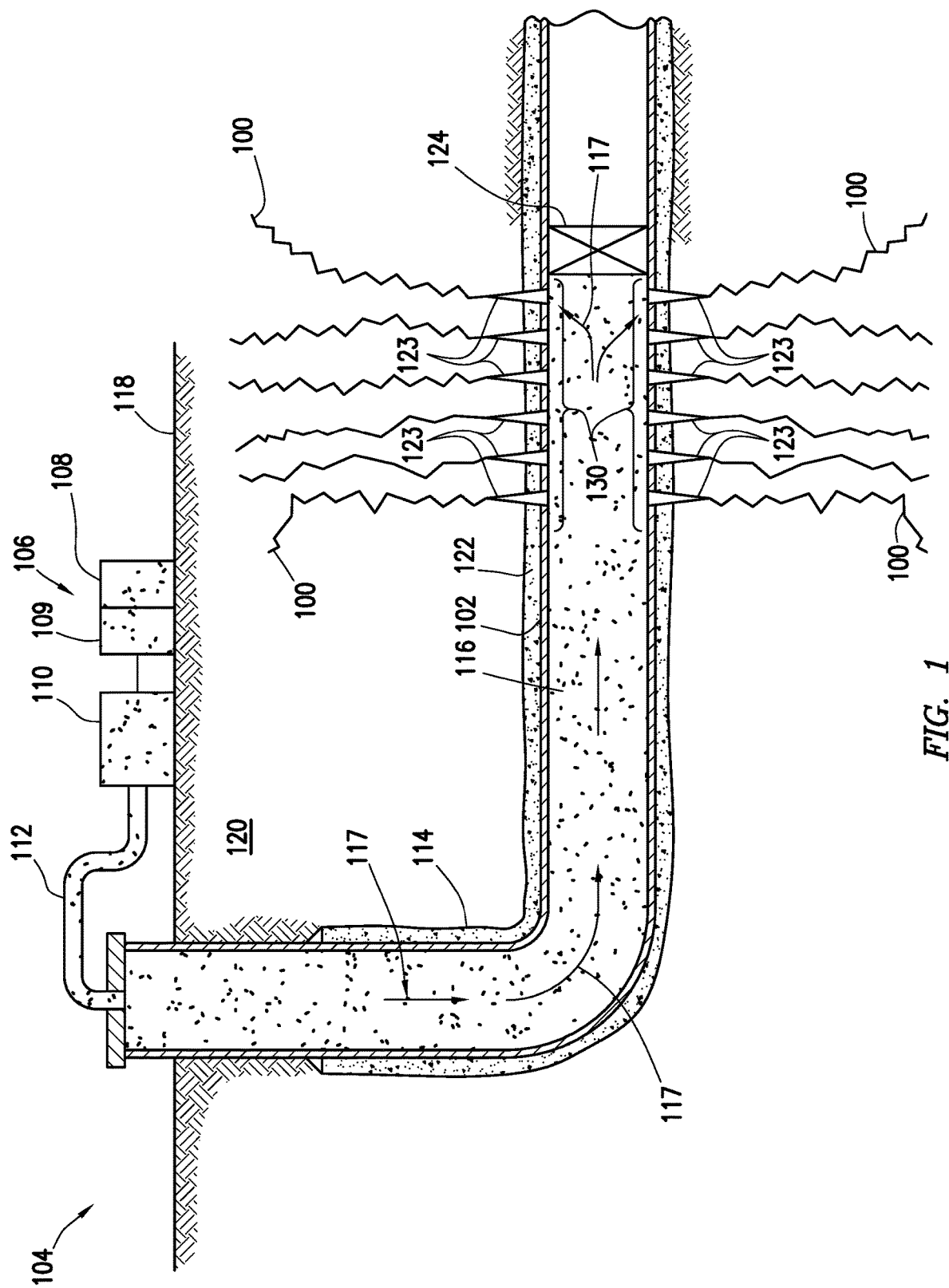
FIG. 1 is a schematic view of an example well system utilized for hydraulic fracturing.

The present disclosure may relate to subterranean operations, and, in one or more implementations, to fracturing methods and fluids comprising a modified halloysite nanotube. In hydraulic fracturing treatments, proppant may play an important role by preventing the closure of fractures, and thus, may improve the production from a fracture-stimulated reservoir. The proppant may be delivered to individual fractures by a fracturing fluid, which may include an aqueous based fluid and/or additives (e.g., gelling agents, friction reducing polymers, etc.) to increase viscosity of the fracturing fluid and reduce the particle sedimentation by gravity.

The aqueous based fluid may include fresh water, produced water, salt water, or any other suitable water. The term "salt water" is used herein to mean unsaturated salt solutions and saturated salt solutions including brines and seawater. Examples of salts that can be used include, but are not limited to, sodium chloride, sodium bromide, calcium chloride, potassium chloride, ammonium chloride and mixtures thereof. Without limitation, the salt or salts used can be present in the salt water in a concentration up to about 66 wt. % thereof and the salt water can have a density up to about 15.5 pounds per gallon (1.857 kg/L). The amount of water in the fracturing fluid may about up to about 60 wt. %, up to about 80 wt. %, or up to about 99 wt. % depending on the concentration of salt and additives. Some specific examples may include 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, or 99 wt. %.

Gelling agents may be included in the fracturing fluid to increase the fracturing fluid's viscosity which may be desired for a number of reasons in subterranean applications. For example, an increase in viscosity may be used for transferring hydraulic pressure to divert treatment fluids to another part of a formation or for preventing undesired leak-off of fluids into a formation from the buildup of filter cakes. The increased viscosity of the gelled or gelled and cross-linked treatment fluid, among other things, may reduce fluid loss and may allow the fracturing fluid to transport significant quantities of suspended proppant. Gelling agents may include, but are not limited to, any suitable hydratable polymer, including, but not limited to, galactomannan gums, cellulose derivatives, combinations thereof, derivatives thereof, and the like. Galactomannan gums are generally characterized as having a linear mannan backbone with various amounts of galactose units attached thereto. Examples of suitable galactomannan gums include, but are not limited to, gum arabic, gum ghatti, gum karaya, tamarind gum, tragacanth gum, guar gum, locust bean gum, combinations thereof, derivatives thereof, and the like. Other suitable gums include, but are not limited to, hydroxyethylguar, hydroxypropylguar, carboxymethylguar, carboxymethylhydroxyethylguar and carboxymethylhydroxypropylguar. Examples of suitable cellulose derivatives include hydroxyethyl cellulose, carboxyethylcellulose, carboxymethylcellulose, and carboxymethylhydroxyethylcellulose; derivatives thereof, and combinations thereof. The cross-linkable polymers included in the treatment fluids of the present disclosure may be naturally-occurring, synthetic, or a combination thereof. The crosslinkable polymers may comprise hydratable polymers that contain one or more functional groups such as hydroxyl, cis-hydroxyl, carboxyl, sulfate, sulfonate, phosphate, phosphonate, amino, or amide groups. In certain systems and/or methods, the crosslinkable polymers may be at least partially crosslinked, wherein at least a portion of the molecules of the crosslinkable polymers are crosslinked by a reaction comprising a crosslinking agent. The amount of gelling agent within the fracturing fluid may range from about 5 lbs/1,000 gal (0.5991 kg/m^3) to about 20 lbs/1,000 gal (2.3946 kg/m^3), about 20 lbs/1,000 gal (2.3946 kg/m^3) to about 60 lbs/1,000 gal (7.19 kg/m^3), or about 60 lbs/1,000 gal (7.19 kg/m^3) to about 200 lbs/1,000 gal (23.97 kg/m^3).

Friction reducing polymers may be included in the fracturing fluid, for example, to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the fracturing fluid. The term "polymer" in the context of a friction reducing polymer, may be intended to refer to the acid form of the friction reducing polymer, as well as its various salts.

The friction reducing polymer may be included in the fracturing fluid in the form of a liquid additive, for example, in an amount of about 0.5 gallons of the friction reducing polymer per thousand gallons of the fracturing fluid ("GPT")

to about 2 GPT, about 2 GPT to about 5 GPT, or about 5 GPT to about 10 GPT. Some specific amounts may include about 0.5 GPT, about 1 GPT, about 1.5 GPT, about 2 GPT, about 2.5 GPT, about 3 GPT, about 3.5 GPT, about 4 GPT, about 4.5 GPT, about 5 GPT, about 5.5 GPT, about 6 GPT, about 6.5 GPT, about 7 GPT, about 7.5 GPT, about 8 GPT, about 8.5 GPT, about 9 GPT, about 9.5 GPT, or about 10 GPT. One of ordinary skill will understand that a volume ratio such as GPT is equivalent to a volume ratio using a different basis such as liters or cubic meters. The friction reducing polymers may be included in the fracturing fluid in an amount sufficient to reduce friction without gel formation upon mixing. By way of example, the fracturing fluid comprising the friction reducing polymer may not exhibit an apparent yield point. While the addition of a friction reducing polymer may minimally increase the viscosity of the fracturing fluid, the friction reducing polymers may generally not be included in the example fracturing fluid in an amount sufficient to substantially increase the viscosity. For example, when proppant is included in the fracturing fluid, velocity rather than fluid viscosity generally may be relied on for proppant transport. Additionally, the friction reducing polymer may be provided as a dry additive and may be present in an amount in the range from about 0.01% wt. % to about 0.15 wt. %, alternatively in an amount in the range from about 0.025 wt. % to about 0.1 wt %, or alternatively in an amount in the range from about 0.1 wt % to about 0.2 wt %.

Typically, the proppant may include a collection of solid particles that may be pumped into the subterranean formation, such that the solid particles hold (or "prop") open the fractures generated during a hydraulic fracturing treatment. The proppant may include a variety of solid particles, including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the proppant may comprise graded sand. Other suitable proppant that may be suitable for use in subterranean applications may also be useful. Without limitation, the proppant may have a particle size in a range from about 2 mesh to about 400 mesh, U.S. Sieve Series. By way of example, the proppant may have a particle size of about 10 mesh to about 70 mesh with distribution ranges of 10-20 mesh, 20-40 mesh, 40-60 mesh, or 50-70 mesh, depending, for example, on the particle sizes of the formation particulates to be screen out. The proppant may be carried by the fracturing fluid. Without limitation, the proppant may be present in the fracturing fluid in a concentration at a point in a range of about 0.1 pounds per gallon ("ppg") (12 kg/m^3) to about 10 ppg (1198 kg/m^3), at a point in a range of about 0.1 ppg (12 kg/m^3) to about 6 ppg (719 kg/m^3), or at a point in a range of about 10 ppg (1198 kg/m^3) to about 20 ppg (2400 kg/m^3). These ranges encompass every number in between, for example. For example, the concentration may range at a point between about 0.5 ppg (24 kg/m^3) to about 4 ppg (479.3 kg/m^3). One of ordinary skill in the art with the benefit of this disclosure should be able to select an appropriate amount of the proppant composition to use for a particular application.

Without limitation, a curable resin may be coated or otherwise disposed on the proppant. Inclusion of the curable resin on the proppant may fill the fractures, providing an in-situ mechanical screen that can hold the proppant in place while maintaining integrity of the well. Curable resins suitable for use with the proppant may include any resin that is capable of forming a hardened, consolidated mass. Many such curable resins are commonly used in consolidation treatments, and some suitable curable resins may include, without limitation, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable curable resins, such as epoxy resins, may be cured with an internal catalyst or activator so that when pumped downhole, they may be cured using only time and temperature. Other suitable curable resins, such as furan resins may generally require a time-delayed catalyst or an external catalyst to help activate the polymerization of the resins if the cure temperature is low (i.e., less than about 250° F., 121° C.) but may cure under the effect of time and temperature if the formation temperature is above about 250° F. (121° C.), or above about 300° F. (148.9° C.). The amount of curable resin may be from about 0.5% to about 1% v/w, about 1% to about 3% v/w, or about 3% to about 5% v/w with respect to the proppant.

Selection of a suitable curable resin may be affected by the temperature of the subterranean formation to which the proppant may be introduced. By way of example, for a subterranean formation having a bottom hole static temperature ("BHST") ranging from about 60° F. (15.5° C.) to about 250° F. (121° C.), two component epoxy based resins comprising a hardenable resin component and a hardening agent component may be used. For a subterranean formation having a BHST ranging from about 300° F. (148.9° C.) to about 600° F. (315.5° C.), a furan based resin may be used, for example. For a subterranean formation having a BHST ranging from about 200° F. (93.3° C.) to about 400° F. (204.4° C.), either a phenolic based resin or a one component HT epoxy based resin may be suitable, for example. For a subterranean formation having a BHST of at least about 175° F. (° 79.4° C.), a phenol/phenol formaldehyde/furfuryl alcohol resin may also be suitable, for example. With the benefit of this disclosure, one of ordinary skill in the art should be able to recognize and select a suitable resin for use in consolidation treatment applications.

Additionally the fracturing fluid may comprise any number of additional additives, including, but not limited to, salts, acids, fluid loss control additives, gas, foamers, corrosion inhibitors, catalysts, friction reducers, antifoam agents, bridging agents, dispersants, flocculants, $H_2S$ scavengers, $CO_2$ scavengers, oxygen scavengers, lubricants, weighting agents and any combination thereof. With the benefit of this disclosure, one of ordinary skill in the art should be able to recognize and select suitable additives for use in the fracturing fluid.

As previously mentioned, the fracturing fluid may comprise a modified halloysite nanotube. Halloysite nanotubes may have a chemical formula of $Al_2Si_2O_5$-$2H_2O$. Halloysite nanotubes may comprise a tubular shape which may further comprise a negatively charged outer surface comprising Si—O—Si groups and a positively charged inner lumen composed of Al—OH groups in aqueous phase. The lumen, or channel through the halloysite nanotube may be able to accept a cargo such as, without limitation, a surfactant.

As one of ordinary skill in the art will appreciate, a surfactant may be included in a fracturing fluid to stimulate production in some formations. A surfactant may affect imbibition in a porous hydrocarbon containing rock. Spontaneous imbibition may occur when a surfactant is adsorbed onto a surface of a porous rock. The imbibition process may displace excess hydrocarbons and allow for easier production of hydrocarbon fluids. The surfactant may "knock off" adsorbed hydrocarbons so they hydrocarbons may be produced form the formation and may provide a favorable surface for other hydrocarbons and formation fluids to be produced from. Imbibition may also spontaneously form micro or nanometer-sized fractures along the faces of primary fractures, secondary fractures, tertiary fractures, and higher order fractures during the hydraulic fracturing process. In general, these micro and nanometer-sized fractures may rapidly close once hydraulic pressure is released from the surface. Formation fluids trapped in micro and nanometer-sized fractures as well as parts of the porous rock connected to the micro and nanometer-sized fractures may not be able to be produced once the fractures are closed. There may be significant quantities of formation fluids left inaccessible in the micro and nano fractures that are not propped open after hydraulic pressure is released.

A halloysite nanotube filled with a surfactant may act as a self-propping surfactant. The halloysite nanotube may be loaded with a surfactant prior to introduction of the halloysite nanotube into a fracturing fluid. Any of a variety of different surfactants may be included in the halloysite nanotubes. Suitable surfactants may include, but are not limited to, anionic surfactants such as sodium, potassium, and ammonium salts of long chain alkyl sulfonates and alkyl aryl sulfonates (such as sodium dodecylbenzene sulfonate); dialkyl sodium sulfosuccinates (such as sodium dodecylbenzene sulfonate or sodium bis-(2-ethylthioxyl)-sulfosuccinate); alkyl sulfates (such as sodium lauryl sulfate); alkyl sulfonates (such as methyl sulfonate, heptyl sulfonate, decylbenzene sulfonate, dodecylbenzene sulfonate); and alkoxylated sulfates; non-ionic surfactants such as ethoxylated alcohols and polyglucosides; cationic surfactants such as alkyl ammonium bromides, and amphoteric or zwitterionic surfactants such as hydroxysultaines (e.g., cocoamidopropyl hydroxysultaine, lauramidopropyl hydroxysultaine, lauryl hydroxysultaine, etc.). The efficiency of surfactant loading in nanotubes may rely on the surfactant chemistry and types of nanotubes, as well as the engineered loading process. In some instances, the surfactant may be present in the halloysite nanotubes at a point ranging from about 5 wt. % to about 30 wt. % of the nanotubes. Alternatively, at a point ranging from about 5 wt. % to about 10 wt. % by weight of the nanotubes, at a point ranging from about 10 wt. % to about 15 wt. % by weight of the nanotubes, at a point ranging from about 15 wt. % to about 20 wt. % by weight of the nanotubes, at a point ranging from about 20 wt. % to about 25 wt. % by weight of the nanotubes, or at a point ranging from about 25 wt. % to about 30 wt. % by weight of the nanotubes.

A surfactant may be a weakly emulsifying surfactant. A weakly emulsifying surfactant may be any surfactant that spontaneously forms a microemulsion upon contact with a hydrocarbon without needing agitation to form the emulsion. The microemulsions may be of Winsor type I, II, III, or IV. Any surfactant that produces a microemulsion that lasts for about 5 minutes or longer that breaks within about 24 hours at ambient (68° F., 20° C.) temperature is considered weakly emulsifying. In contrast, a non-emulsifying surfactant may cause complete phase separation between an aqueous and hydrocarbon phase. A weakly emulsifying surfactant may be present in the halloysite nanotubes at a point ranging from about 0.1 wt. % to about 0.3 wt. % by weight of the nanotubes, about 0.3 wt. % to about 0.7 wt. %, or about 0.7 wt. % to about 1 wt. %.

A halloysite nanotube may become aligned with the direction of shear flow of the fracturing fluid within the wellbore and fractures created during pumping. Micro and nano sized fractures may propagate within the fractured subterranean formation and halloysite nanotubes may be inserted into the micro and nano sized fractures to the orientation of the flow with respect to the fractures. Micro fractures may have widths of less than about 100 μm, less than about 50 μm, or less than about 10 μm and may have a height of several orders larger than their widths, for example about 10 times the width, about 100 times the width, or about 1000 times the width. Nano fractures may have width of about 100 nm or less and may have a height of several orders larger than their widths, for example about 10 times the width or greater, about 100 times the width or greater, or about 1000 times the width or greater. Halloysite nanotubes may stack into and prop open the micro and nano fractures. It is believed the halloysite nanotubes do not form a conventional proppant pack but rather may form a partial pack, monolayers, or multiple layers within a nano or micro sized fracture. Accordingly, the halloysite nanotube may be used in place of, or in addition to the proppant previously described herein. A halloysite nanotube may have some advantages over traditional nano proppant and micro proppant as the hollow interior of the halloysite nanotube may allow for additional flow capacity as compared to a proppant pack comprising nano or micro sized proppant. A flow path through a halloysite nanotube may be wider and less tortuous than a flow path through a nano proppant pack. Additionally, the surfactant included in the interior of the halloysite nanotube may flow into the micro or nano fracture and modify the rock surface as previously described to increase hydrocarbon production. Including halloysite nanotubes may allow for direct placement of surfactant molecules where they are needed which may not be possible with a micro or nano proppant pack.

Halloysite nanotubes may also comprise other cargo in addition to, or in lieu of, a surfactant. Some non-limiting examples include, for example, a scale inhibitor, a clay stabilizer, a biocide, a paraffin inhibitor, a breaker, a cross-linking agent, a surfactant, an in-situ acid generator, a chelating agent, or any combinations thereof. Another cargo may be tagging agents and tracer materials. The tagging agents and tracer materials may comprise chemicals that are traceable in a wellbore such as fluorescent, radioactive, and neutron absorbing materials. In some instances, the chemicals may be nanoparticles. Tracing and tagging materials may be used to trace where formation fluids are produced from a fracturing stage or along a specific fractured interval. Modified halloysite nanotubes may be made by modifying raw halloysite nanotubes with a cargo. For example, an anionic surfactant may be adsorbed on the positively charged lumen inside the halloysite nanotube to be modified. A halloysite nanotube modified with an anionic surfactant may have a tubular shape with a neutral internal surface and a negatively charged outer surface. Cationic and amphoteric surfactants as well as the other cargos previously mentioned may also be introduced into the interior of the halloysite nanotubes.

The modified halloysite nanotubes may be use at any point during a fracturing operation. A "pad" fluid may be pumped into a subterranean formation above the fracture gradient of the formation to initiate and propagate one or more fractures within the subterranean formation. Pumping of the pad fluid may initiate micro and nano sized fractures as well as larger fracture sizes within the subterranean formation. The pad fluid may generally comprise a fracturing fluid as previously described but without a propping agent. After the pad fluid is pumped, a proppant laden fracturing fluid may be pumped into the wellbore and subterranean formation at or above the fracture gradient. In some fracturing operations, the proppant may be stepped up in increments as the fracturing fluid is pumped. The term "fracturing fluid," as used herein, is intended to include the pad fluid.

The modified halloysite nanotubes may be included in the fracturing fluid in any amount suitable for a particular application. For example, without limitation, the modified halloysite nanotubes may be included in the fracturing fluid in an amount of about 0.05 ppg (pounds per gallon) (5.99 kg/m^3) to about 0.5 ppg (59.9 kg/m^3). Alternatively, about 0.05 ppg to (5.99 kg/m^3) about 0.1 ppg (12 kg/m^3), about 0.1 ppg (12 kg/m^3) to about 0.15 ppg (18 kg/m^3), about 0.15 ppg (18 kg/m^3) to about 0.2 ppg (24 kg/m^3), about 0.25 ppg (30 kg/m^3) to about 0.3 ppg (35.9 kg/m^3), about 0.3 ppg (35.9 kg/m^3) to about 0.35 ppg (41.9 kg/m^3), about 0.35 ppg (41.9 kg/m^3) to about 0.4 ppg (47.9 kg/m^3), about 0.4 ppg (47.9 kg/m^3) to about 0.45 ppg (53.9 kg/m^3), or about 0.45 ppg (53.9 kg/m^3) to about 0.5 ppg (59.9 kg/m^3). Additionally, the modified halloysite nanotubes may be present in any amount between the ranges provided.

The halloysite nanotubes, modified with a cargo or unmodified, may be provided in any form such as, for example, a liquid additive or a bulk solid. In the instance where the halloysite nanotubes are provided as a liquid additive, the halloysite nanotubes may be present in a concentrated liquid. The concentrated liquid may be added to a mixing tub in a fracturing blender, in line with a header pipe, injected into an eye of a centrifugal pump, or at any other point before the pad fluid is introduced into a well head. The halloysite nanotubes provided as a bulk solid may be added to a mixing tub in a fracturing blender by a solids conveyance system such as a screw type device, pneumatic conveyance, gravity conveyance, or any other solids conveyance system capable of conveying the halloysite nanotubes.

As will be further illustrated in examples below, pumping a fracturing fluid comprising halloysite nanotubes modified with a cargo may have advantages over other methods of delivering the same cargo in a fluid. In some fracturing operations, a surfactant may be mixed in a fracturing fluid and pumped into a subterranean formation. Fluids flowing through induced and natural fractures in a formation may flow through the path of least resistance. Relatively smaller fractures such as nano and micro fractures may present a relatively higher resistance to fluid flow as opposed to larger fractures which may lead to relatively lower amounts of surfactant being place in the fractures. Additionally, surfactant placed in larger fractures may also be produced alongside formation fluids such as oil, gas, and water. A surfactant contained within a halloysite nanotube may be placed directly in nano and micro sized fractures due to the halloysite nanotube being positioned within the fractures. The surfactants contained within the halloysite nanotube may diffuse out into the nano or micro fracture over time thereby providing surfactant into the fracture for a prolonged period of time. Convection of fluids through the halloysite nanotube into the micro and nano sized fractures may also drive the surfactant or other cargo into the fractures. Closure stresses from the subterranean formation fractures closing after surface pressure is released may contribute to leaching of the surfactant and other cargo into the fractures. All the processes described herein may occur over an extended period of time, for example on the order of about 1 day to about 1 month or longer.

FIG. 1 illustrates an example of a well system 104 that may be used to introduce proppant 116 into fractures 100. Well system 104 may include a fluid handling system 106, which may include fluid supply 108, mixing equipment 109, pumping equipment 110, and wellbore supply conduit 112. Pumping equipment 110 may be fluidly coupled with the fluid supply 108 and wellbore supply conduit 112 to communicate a fracturing fluid 117, which may comprise proppant 116 into wellbore 114. Proppant 116 may be any of the proppants described herein as well as modified halloysite nanotubes, unmodified halloysite nanotubes, and any combinations thereof. The fluid supply 108 and pumping equipment 110 may be above the surface 118 while the wellbore 114 is below the surface 118.

Well system 104 may also be used for the pumping of a pad or pre-pad fluid into the subterranean formation at an pumping rate and pressure at or above the fracture gradient to create at least one fracture 100 in subterranean formation 120. Well system 104 may then pump the fracturing fluid 117 into subterranean formation 120 surrounding the wellbore 114. Generally, a wellbore 114 may include horizontal, vertical, slanted, curved, and other types of wellbore geometries and orientations, and the proppant 116 may generally be applied to subterranean formation 120 surrounding any portion of wellbore 114, including fractures 100. The wellbore 114 may include the casing 102 that may be cemented (or otherwise secured) to the wall of the wellbore 114 by cement sheath 122. Perforations 123 may allow communication between the wellbore 114 and the subterranean formation 120. As illustrated, perforations 123 may penetrate casing 102 and cement sheath 122 allowing communication between interior of casing 102 and fractures 100. A plug 124, which may be any type of plug for oilfield applications (e.g., bridge plug), may be disposed in wellbore 114 below the perforations 123.

In accordance with systems and/or methods of the present disclosure, a perforated interval of interest 130 (depth interval of wellbore 114 including perforations 123) may be isolated with plug 124. A pad or pre-pad fluid may be pumped into the subterranean formation 120 at an pumping rate and pressure at or above the fracture gradient to create at least one fracture 100 in subterranean formation 120. Then, proppant 116 may be mixed with an aqueous based fluid via mixing equipment 109, thereby forming a fracturing fluid 117, and then may be pumped via pumping equipment 110 from fluid supply 108 down the interior of casing 102 and into subterranean formation 120 at or above a fracture gradient of the subterranean formation 120. Pumping the fracturing fluid 117 at or above the fracture gradient of the subterranean formation 120 may create (or enhance) at least one fracture (e.g., fractures 100) extending from the perforations 123 into the subterranean formation 120. Alternatively, the fracturing fluid 117 may be pumped down production tubing, coiled tubing, or a combination of coiled tubing and annulus between the coiled tubing and the casing 102.

At least a portion of the fracturing fluid 117 may enter the fractures 100 of subterranean formation 120 surrounding wellbore 114 by way of perforations 123. Perforations 123 may extend from the interior of casing 102, through cement sheath 122, and into subterranean formation 120.

Figure 2:
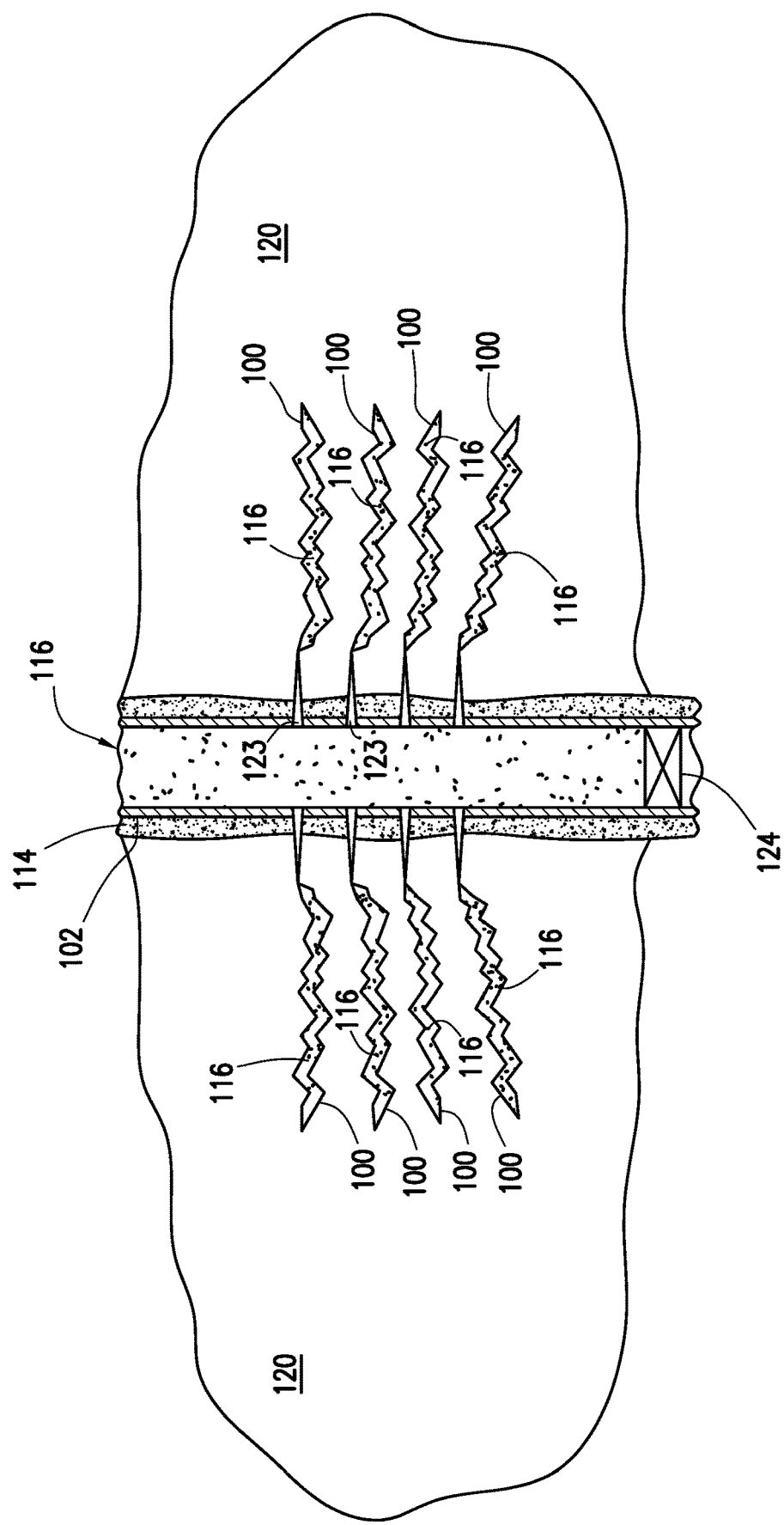
FIG. 2 is a schematic view of an example of a wellbore after introduction of fracturing fluid.

Referring to FIG. 2, the wellbore 114 is shown after placement of the proppant 116 in accordance with systems and/or methods of the present disclosure. Proppant 116 may be positioned within fractures 100, thereby propping open fractures 100.

The pumping equipment 110 may include a high pressure pump. As used herein, the term "high pressure pump" refers to a pump that is capable of delivering the fracturing fluid 117 and/or pad/pre-pad fluid downhole at a pressure of about 1000 psi or greater. A high pressure pump may be used when it is desired to introduce the fracturing fluid 117 and/or pad/pre-pad fluid into subterranean formation 120 at or above a fracture gradient of the subterranean formation 120, but it may also be used in cases where fracturing is not desired. Additionally, the high pressure pump may be capable of fluidly conveying particulate matter, such as the proppant 116, into the subterranean formation 120. Suitable high pressure pumps may include, but are not limited to, floating piston pumps and positive displacement pumps. Without limitation, the initial pumping rates of the pad fluid, pre-pad fluid and/or fracturing fluid 117 may range from about 15 barrels per minute ("bbl/min") (2385 l/min) to about 80 bbl/min (12719 l/min), enough to effectively create a fracture into the formation and place the proppant 116 into at least one fracture 101.

Alternatively, the pumping equipment 110 may include a low pressure pump. As used herein, the term "low pressure pump" refers to a pump that operates at a pressure of about 1000 psi or less. A low pressure pump may be fluidly coupled to a high pressure pump that may be fluidly coupled to a tubular (e.g., wellbore supply conduit 112). The low pressure pump may be configured to convey the fracturing fluid 117 and/or pad/pre-pad fluid to the high pressure pump. The low pressure pump may "step up" the pressure of the fracturing fluid 117 and/or pad/pre-pad fluid before it reaches the high pressure pump.

Mixing equipment 109 may include a mixing tank that is upstream of the pumping equipment 110 and in which the fracturing fluid 117 may be formulated. The pumping equipment 110 (e.g., a low pressure pump, a high pressure pump, or a combination thereof) may convey fracturing fluid 117 from the mixing equipment 109 or other source of the fracturing fluid 117 to the casing 102. Alternatively, the fracturing fluid 117 may be formulated offsite and transported to a worksite, in which case the fracturing fluid 117 may be introduced to the casing 102 via the pumping equipment 110 directly from its shipping container (e.g., a truck, a railcar, a barge, or the like) or from a transport pipeline. In either case, the fracturing fluid 117 may be drawn into the pumping equipment 110, elevated to an appropriate pressure, and then introduced into the casing 102 for delivery downhole.

The exemplary fracturing fluid disclosed herein may directly or indirectly affect one or more components or pieces of equipment associated with the preparation, delivery, recapture, recycling, reuse, and/or disposal of the fracturing fluid. For example, the fracturing fluid may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant composition. The fracturing fluid may also directly or indirectly affect any transport or delivery equipment used to convey the fracturing fluid to a well site or downhole such as, for example, any transport vessels, conduits, pipelines, trucks, tubulars, and/or pipes used to compositionally move the fracturing fluid from one location to another, any pumps, compressors, or motors (e.g., topside or downhole) used to drive the fracturing fluid into motion, any valves or related joints used to regulate the pressure or flow rate of the fracturing fluid, and any sensors (i.e., pressure and temperature), gauges, and/or combinations thereof, and the like. The disclosed fracturing fluid may also directly or indirectly affect the various downhole equipment and tools that may come into contact with the fracturing fluid such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The systems and methods may include any of the various features of the systems and methods disclosed herein, including one or more of the following statements.

Statement 1. A method of fracturing a subterranean formation, the method comprising: pumping a fracturing fluid into the subterranean formation, through a wellbore, at or above a fracture gradient of the subterranean formation, wherein the fracturing fluid comprises halloysite nanotubes.

Statement 2. The method of statement 1 wherein the fracturing fluid is a pad fluid or a pre-pad fluid.

Statement 3. The method of any one of statements 1-2 wherein the fracturing fluid comprises an aqueous fluid.

Statement 4. The method of any one of statements 1-3 wherein the halloysite nanotubes further comprise a cargo.

Statement 5. The method of any one of statements 1-4 wherein the cargo comprises at least one additive selected from the group consisting of a scale inhibitor, a clay stabilizer, a biocide, a paraffin inhibitor, a breaker, a crosslinking agent, a surfactant, an in-situ acid generator, a chelating agent, a tracer, a tagging agent, and combinations thereof.

Statement 6. The method of any one of statement 1-5 wherein the cargo comprises a surfactant.

Statement 7. The method of any one of statements 1-6 wherein the halloysite nanotubes are present in the fracturing fluid in an amount ranging from about 0.05 pounds to about 0.5 pounds per gallon of the fracturing fluid.

Statement 8. The method of any one of statements 1-7 further comprising pumping a proppant laden fluid into the subterranean formation.

Statement 9. The method of any one of statements 1-8 further comprising depositing the halloysite nanotubes into one or more fractures in the subterranean formation such that the halloysite nanotubes form a partial proppant pack in the one or more fractures, wherein the halloysite nanotubes comprise an anionic surfactant adsorbed in an interior of the halloysite nanotubes, wherein the fractures are nano-fractures and/or micro-fractures, wherein the fracturing fluid is a pad fluid or pre-pad fluid, and wherein the method further comprises pumping an additional fracturing fluid into the subterranean formation subsequent to the fracturing fluid, wherein the additional fracturing fluid comprises an aqueous fluid and a proppant.

Statement 10. A method of fracturing a subterranean formation, the method comprising: pumping a pad fluid into the subterranean formation wherein the pad fluid comprises halloysite nanotubes wherein the halloysite nanotubes comprise an anionic surfactant; allowing the pad fluid to initiate or extend at least one fracture within the subterranean formation; pumping a fracturing fluid into the subterranean formation subsequent to the pad fluid, wherein the fracturing fluid comprises an aqueous fluid and a proppant; and placing the proppant in the at least one fracture.

Statement 11. The method of statement 10 wherein the step of pumping the pad fluid comprises: preparing the pad fluid by mixing an aqueous fluid and the halloysite nanotubes; and pumping the pad fluid using a pump through a wellhead into a wellbore and the subterranean formation fluidically coupled to the wellbore.

Statement 12. The method of any one of statements 10-11 wherein the halloysite nanotubes are present in the pad fluid in an amount ranging from about 0.05 pounds to about 0.5 pounds per gallon of the fracturing fluid.

Statement 13. The method of any one of statements 10-12 wherein the step of pumping the fracturing fluid comprises: preparing the fracturing fluid by mixing an aqueous fluid and the proppant; and pumping the fracturing fluid using a pump through a wellhead into a wellbore and the subterranean formation fluidically coupled to the wellbore.

Statement 14. The method of any one of statements 10-13 wherein the proppant is present in the fracturing fluid in an amount ranging from about 0.1 pounds to about 10 pounds per gallon of the fracturing fluid.

Statement 15. The method of any one of statements 10-14 wherein the pad fluid, fracturing fluid, or both the pad fluid and the fracturing fluid further comprise an additional halloysite nanotube modified with a cargo selected from the group consisting of a scale inhibitor, a clay stabilizer, a biocide, a paraffin inhibitor, a breaker, a crosslinking agent, a cationic surfactant, an amphoteric surfactant, an in-situ acid generator, a chelating agent, a tracer, a tagging agent, and combinations thereof.

Statement 16. A fracturing fluid comprising: water; and halloysite nanotubes, wherein the halloysite nanotubes comprise a cargo, wherein the cargo comprises a surfactant.

Statement 17. The fracturing fluid of statement 16 wherein the cargo further comprises at least one additive selected from the group consisting of a scale inhibitor, a clay stabilizer, a biocide, a paraffin inhibitor, a breaker, a cross-linking agent, a surfactant, an in-situ acid generator, a chelating agent, a tracer, a tagging agent, and combinations thereof.

Statement 18. The fracturing fluid of any one of statements 16-17 wherein the surfactant comprises at least one surfactant selected from the group consisting of sodium, potassium, and ammonium salts of long chain alkyl sulfonates and alkyl aryl sulfonates, sodium dodecylbenzene sulfonate; dialkyl sodium sulfosuccinates, sodium dodecylbenzene sulfonate, sodium bis-(2-ethylthioxyl)-sulfosuccinate), alkyl sulfates, sodium lauryl sulfate, methyl sulfonate, heptyl sulfonate, decylbenzene sulfonate, dodecylbenzene sulfonate, alkoxylated sulfates, ethoxylated alcohols, polyglucosides, alkyl ammonium bromides, hydroxysultaines, cocoamidopropyl hydroxysultaine, lauramidopropyl hydroxysultaine, lauryl hydroxysultaine, and combinations thereof.

Statement 19. The fracturing fluid of any one of statements 16-18 wherein the surfactant is weakly emulsifying.

Statement 20. The fracturing fluid of any one of statements 16-19 wherein the halloysite nanotubes are present in the fracturing fluid in an amount ranging from about 0.05 pounds to about 0.5 pounds per gallon of the fracturing fluid.

To facilitate a better understanding of the present disclosure, the following examples of certain aspects of some of the systems and methods are given. In no way should the following examples be read to limit, or define, the entire scope of the disclosure.

Example 1

A stability experiment for determining the stability of modified halloysite nanotubes was prepared as follows. A sample of non-modified halloysite nanotubes was measured and added to a beaker. Water was added and the mixture was agitated. It was observed that, after four hours, the halloysite nanotubes had settled out of the water and the solution had become clear. A sample of halloysite nanotubes modified with an sodium dodecylbenzenesulfonate based anionic surfactant was measured and added to a beaker. Water was added and the mixture was agitated. After four hours, it was observed that the modified halloysite nanotubes remained suspended with no visible separation of the nanotubes into a distinct solid phase. The modified halloysite nanotube and water solution was left to rest for an additional two weeks and there was no visible breakout of the modified nanotubes to the bottom of the beaker. The results indicate the modified halloysite nanotube solution is stable as a dispersion.

Example 2

A surface tension test was performed to measure the interfacial activity of modified halloysite nanotubes. A sample was prepared with 1 GPT of non-modified halloysite in water and the surface tension was measured over time. It was observed that the surface tension remained approximately constant at approximately 74.5 mN/m from a time period of about 10 milliseconds to about $2.5e^5$ milliseconds. A second sample was prepared with 1 GPT of anionic surfactant modified halloysite nanotubes. The surface tension of the second sample was measured over time. It was observed that the surface tension rose from about 71.5 mN/m at 10 milliseconds to about 72.5 mN/m at about 50000 milliseconds before dropping to about 69.75 mN/m at about $2.5e^5$ milliseconds. Surface tension test results indicate the surfactant is being adsorbed inside the lumen rather than the surface of the halloysite nanotube.

Example 3

A second surface tension test was prepared with 1 GPT of surfactant modified halloysite nanotubes in produced Austin Chalk oil and produced Eagle Ford oil. The surface tension was measured using a pendent drop tensiometer. It was observed that the halloysite nanotube and Austin Chalk oil had an interfacial tension of 5.8 mN/m and the halloysite nanotube and Eagle Ford oil had an interfacial tension of 14 mN/m. The relatively lower interfacial surface tension of the Example 3 containing oil as compared to Example 2 containing only water may be explained by release of surfactants from the lumen of the halloysite nanotube.

Example 4

An emulsion tendency test was prepared using various concentrations of anionic surfactant modified halloysite nanotubes in Eagle Ford and Austin Chalk oil at 200° F. Modified halloysite nanotubes may have the capability of trapping oil inside the lumen because of inner hydrophobic cores. Oil may be attached on the hydrophobic tail of surfactant in the halloysite nanotube due to hydrophobic interaction between oil and the hydrophobic tail end of the surfactant. The results of the emulsion test are shown in Table 1 and Table 2. It was observed that the emulsions were completely broken in the course of 3 days. The samples were kept at 200° F. (93.3° C.) throughout the experiment.

TABLE 1

GPT Anionic Modified Halloysite Nanotubes in Eagle Ford Oil

| Time | 0.1 | 0.2 | 1 | 5 | 10 |
|---|---|---|---|---|---|
| 0 | NE | NE | NE | NE | NE |
| 11 seconds | NE | NE | E | E | E |
| 1 minute | NE | NE | E | E | E |
| 20 minutes | NE | NE | NE | E | E |
| 3 days | NE | NE | NE | NE | NE |

NE = Not Emulsified  E = Emulsified

TABLE 2

GPT Anionic Modified Halloysite Nanotubes in Austin Chalk Oil

| Time | 0.1 | 0.2 | 1 | 5 | 10 |
|---|---|---|---|---|---|
| 0 | NE | NE | NE | NE | NE |
| 11 seconds | NE | NE | E | E | E |
| 1 minute | NE | NE | E | E | E |
| 3 days | NE | NE | NE | NE | NE |

NE = Not Emulsified  E = Emulsified

Example 5

A test was run to gauge the oil recovery from saturated drill cuttings. Crude oil and cuttings were sampled from the Permian Basin at the same location. The crude oil was allowed to saturate the drill cuttings before the experiment was run. Anionic surfactant modified halloysite nanotube (MHNT) was compared to two commercially available surfactants, LOSURF™ 300D (available from Halliburton Energy Services) and H335. The experiment was performed at 140° F. (60° C.). It was observed that MHNT had a recovery of about 6.2%.

TABLE 3

| Surfactant | % Recovery |
|---|---|
| MHNT | 6.2 |
| Lo-Surf 300D | 8 |
| H335 | 2 |

In a demonstrative experiment: a flow of 4% of 0.4 mm sand particle suspension in water flow with velocity $V_{iw}$ 2 m/s in a pipe with internal diameter $D_f$=0.1 m. The fracture 100 (e.g., as shown on FIGS. 1 and 2) may have an inlet diameter of approximately 0.01 m and a flow speed of approximately $V_{if}$=1.5 m/s. For corresponding value of the Stokes number St=4.27 and velocity ratio □=0.75, one may find (e.g., with a computer system) the efficiency ratio R=0.83. For the proppant 116 (e.g., shown on FIGS. 1 and 2) flow in the fracture (e.g., fracture 100 shown on FIGS. 1 and 2), Equation (4) in this case yields the average proppant volume concentration $□_{pf}$=0.83*0.04=0.0332 and the proppant 116 mass flow rate $Q_{pf}$=3.03×10$^{-4}$ kg/s. For a series of consequent fractures 100, the procedure may need to be repeated to yield proppant flow distribution in the whole fracture system (e.g., fractures 100 as shown on FIGS. 1 and 2).

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

Each of the terms "program" and "software" may refer to executable computer code, groups of executable computer code, or computer code that may become or be used to create execute computer code. Particular components referred to as "programs" in the present disclosure may equivalently be referred to as "software". Likewise, particular components referred to as "software" in the present disclosure may equivalently be referred to as "programs". The terminology may be adopted merely to help the reader distinguish different computer codes (or groups of computer code).

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in the present disclosure and one or more patent(s) or other documents that may be incorporated herein by reference, the definitions that are consistent with the present disclosure should be adopted.

What is claimed is:

1. A method of fracturing a subterranean formation, the method comprising:
   pumping a fracturing fluid into the subterranean formation, through a wellbore, at or above a fracture gradient of the subterranean formation, wherein the fracturing fluid comprises halloysite nanotubes, wherein the fracturing fluid is a pad fluid or a pre-pad fluid,
   wherein the halloysite nanotubes comprise a cargo, wherein the cargo comprises at least one additive selected from the group consisting of a scale inhibitor, a clay stabilizer, a biocide, a paraffin inhibitor, a breaker, a crosslinking agent, a surfactant, an in-situ acid generator, a chelating agent, a tracer, a tagging agent, and combinations thereof.

2. The method of claim 1, wherein the halloysite nanotubes are present in the fracturing fluid in an amount ranging from about 0.05 pounds to about 0.5 pounds per gallon of the fracturing fluid.

3. The method of claim 1, wherein the tracer and tagging agent comprise fluorescent, radioactive, and neutron absorbing materials.

4. A method of fracturing a subterranean formation, the method comprising:
   pumping a fracturing fluid into the subterranean formation, through a wellbore, at or above a fracture gradient of the subterranean formation, wherein the fracturing fluid comprises halloysite nanotubes, wherein the fracturing fluid is a pad fluid or a pre-pad fluid,
   wherein the halloysite nanotubes comprise a cargo, wherein the cargo comprises a surfactant.

5. The method of claim 4 wherein the fracturing fluid comprises an aqueous fluid.

6. The method of claim 4 wherein the cargo comprises an anionic surfactant.

7. The method of claim 4 wherein the halloysite nanotubes are present in the fracturing fluid in an amount ranging from about 0.05 pounds to about 0.5 pounds per gallon of the fracturing fluid.

8. The method of claim 4 further comprising pumping a proppant laden fluid into the subterranean formation.

9. A method of fracturing a subterranean formation, the method comprising:
   pumping a pad fluid into the subterranean formation wherein the pad fluid comprises halloysite nanotubes wherein the halloysite nanotubes comprise a cargo, wherein the cargo comprises an anionic surfactant;
   allowing the pad fluid to initiate or extend at least one fracture within the subterranean formation;
   pumping a fracturing fluid into the subterranean formation subsequent to the pad fluid, wherein the fracturing fluid comprises an aqueous fluid and a proppant; and
   placing the proppant in the at least one fracture.

10. The method of claim 9 wherein the step of pumping the pad fluid comprises:
    preparing the pad fluid by mixing an aqueous fluid and the halloysite nanotubes; and
    pumping the pad fluid using a pump through a wellhead into a wellbore and the subterranean formation fluidically coupled to the wellbore.

11. The method of claim 9 wherein the halloysite nanotubes are present in the pad fluid in an amount ranging from about 0.05 pounds to about 0.5 pounds per gallon of the pad fluid.

12. The method of claim 9 wherein the step of pumping the fracturing fluid comprises:
    preparing the fracturing fluid by mixing an aqueous fluid and the proppant; and
    pumping the fracturing fluid using a pump through a wellhead into a wellbore and the subterranean formation fluidically coupled to the wellbore.

13. The method of claim 9 wherein the proppant is present in the fracturing fluid in an amount ranging from about 0.1 pounds to about 10 pounds per gallon of the fracturing fluid.

14. The method of claim 9 wherein the pad fluid, fracturing fluid, or both the pad fluid and the fracturing fluid further comprise an additional halloysite nanotube modified with a cargo selected from the group consisting of a scale inhibitor, a clay stabilizer, a biocide, a paraffin inhibitor, a breaker, a crosslinking agent, a cationic surfactant, an amphoteric surfactant, an in-situ acid generator, a chelating agent, a tracer, a tagging agent, and combinations thereof.

15. A method of fracturing a subterranean formation, the method comprising:
    pumping a fracturing fluid into the subterranean formation, through a wellbore, at or above a fracture gradient of the subterranean formation, wherein the fracturing fluid comprises halloysite nanotubes, wherein the fracturing fluid is a pad fluid or a pre-pad fluid;
    depositing the halloysite nanotubes into one or more fractures in the subterranean formation such that the halloysite nanotubes form a partial proppant pack in the one or more fractures, wherein the halloysite nanotubes comprise an anionic surfactant adsorbed in an interior of the halloysite nanotubes, wherein the fractures are nano-fractures and/or micro-fractures; and
    pumping an additional fracturing fluid into the subterranean formation subsequent to the fracturing fluid, wherein the additional fracturing fluid comprises an aqueous fluid and a proppant.

16. The method of claim 15, wherein the step of pumping the fracturing fluid comprises:
    preparing the fracturing fluid by mixing an aqueous fluid and the proppant; and
    pumping the fracturing fluid using a pump through a wellhead into a wellbore and the subterranean formation fluidically coupled to the wellbore.

17. The method of claim 15, wherein the halloysite nanotubes are present in the fracturing fluid in an amount ranging from about 0.05 pounds to about 0.5 pounds per gallon of the fracturing fluid.

18. A method of fracturing a subterranean formation, the method comprising:
    pumping a fracturing fluid into the subterranean formation, through a wellbore, at or above a fracture gradient of the subterranean formation, wherein the fracturing fluid comprises halloysite nanotubes, wherein the fracturing fluid is a pad fluid or a pre-pad fluid,
    wherein the halloysite nanotubes comprise a cargo, wherein the cargo comprises a surfactant;

wherein the surfactant comprises at least one surfactant selected from the group consisting of sodium, potassium, and ammonium salts of long chain alkyl sulfonates and alkyl aryl sulfonates, sodium dodecylbenzene sulfonate; dialkyl sodium sulfosuccinates, sodium dodecylbenzene sulfonate, sodium bis-(2-ethylthioxyl)-sulfosuccinate), alkyl sulfates, sodium lauryl sulfate, methyl sulfonate, heptyl sulfonate, decylbenzene sulfonate, dodecylbenzene sulfonate, alkoxylated sulfates, ethoxylated alcohols, polyglucosides, alkyl ammonium bromides, hydroxysultaines, cocoamidopropyl hydroxysultaine, lauramidopropyl hydroxysultaine, lauryl hydroxysultaine, and combinations thereof.

19. The method of claim 18, wherein the halloysite nanotubes are present in the fracturing fluid in an amount ranging from about 0.05 pounds to about 0.5 pounds per gallon of the fracturing fluid.

20. The method of claim 18, wherein the step of pumping the fracturing fluid comprises:
   preparing the fracturing fluid by mixing an aqueous fluid and the proppant; and
   pumping the fracturing fluid using a pump through a wellhead into a wellbore and the subterranean formation fluidically coupled to the wellbore.

\* \* \* \* \*